United States Patent [19]
Buckland et al.

[11] Patent Number: 5,875,310
[45] Date of Patent: Feb. 23, 1999

[54] SECONDARY I/O BUS WITH EXPANDED SLOT CAPACITY AND HOT PLUGGING CAPABILITY

[75] Inventors: Patrick Allen Buckland, Austin, Tex.; Richard Allen Kelley, Apex, N.C.; Danny Marvin Neal, Round Rock, Tex.

[73] Assignee: International Business Machines Corporation, Armonk, N.Y.

[21] Appl. No.: 653,040

[22] Filed: May 24, 1996

[51] Int. Cl.⁶ .................................................. G06F 13/40
[52] U.S. Cl. ........................ 395/306; 395/286; 395/281
[58] Field of Search .................................. 395/282, 283, 395/306, 308, 309, 286, 281, 311, 822, 851, 858, 821

[56] References Cited

U.S. PATENT DOCUMENTS

| | | | |
|---|---|---|---|
| 5,509,124 | 4/1996 | Bourke et al. | 395/280 |
| 5,568,619 | 10/1996 | Blackledge et al. | 395/281 |
| 5,581,709 | 12/1996 | Ito et al. | 395/200.15 |
| 5,586,281 | 12/1996 | Parrett | 395/283 |
| 5,594,873 | 1/1997 | Garrett | 395/281 |
| 5,664,124 | 9/1997 | Katz et al. | 395/309 |

*Primary Examiner*—Meng-Ai T. An
*Assistant Examiner*—Harold J. Kim
*Attorney, Agent, or Firm*—Casimer K. Salys; Mark E. McBurney

[57] ABSTRACT

A computer system is provided which supports an increase in the number of pluggable cards on the secondary I/O bus by using driver/receiver modules and direction control logic in place of more complex and more expensive bus to bus bridges. The number of pluggable cards on the I/O bus in a computer system is limited by the electrical loading of each card and the frequency of operations on the bus. Reducing the bus frequency provides more signal propagation time. The added signal propagation time supports the extension of the bus by driver/receiver modules and logic which controls the direction the driver/receiver modules drive the bus signals. Further, the driver/receiver modules support changing the hardware configuration of the system by adding or removing an I/O card without the need to cease data processing activity for the entire computer.

14 Claims, 11 Drawing Sheets

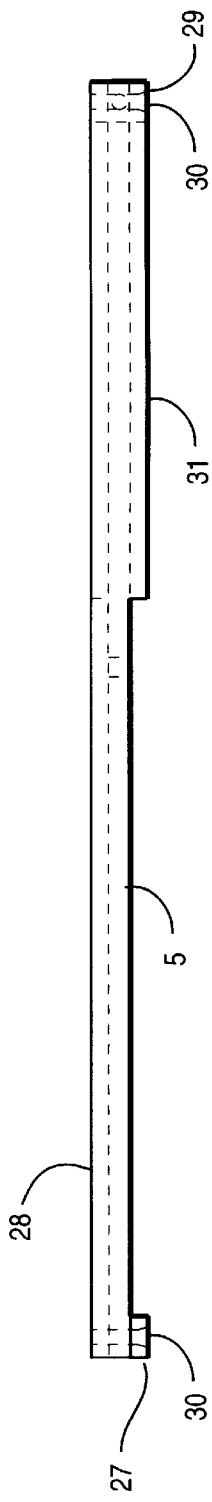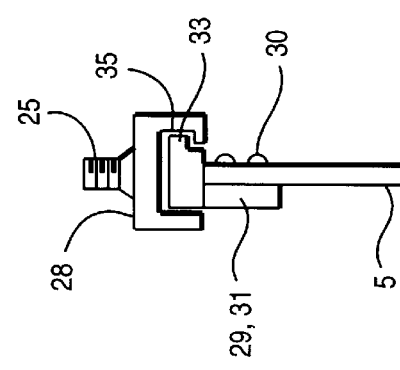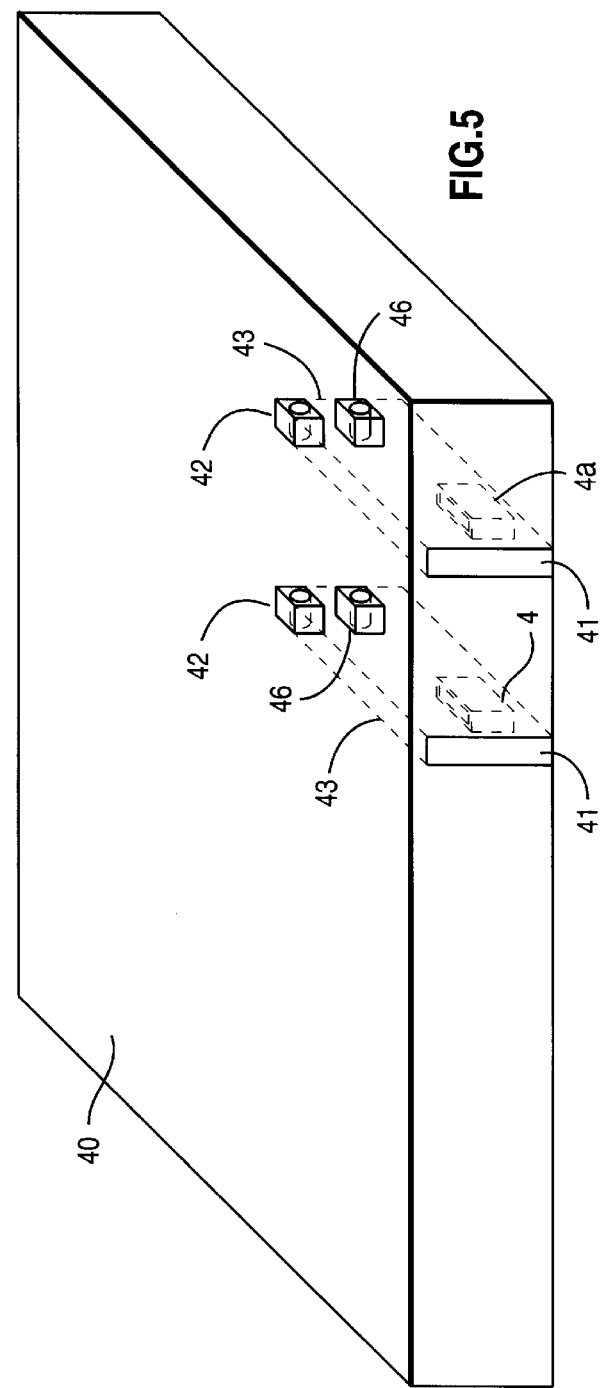

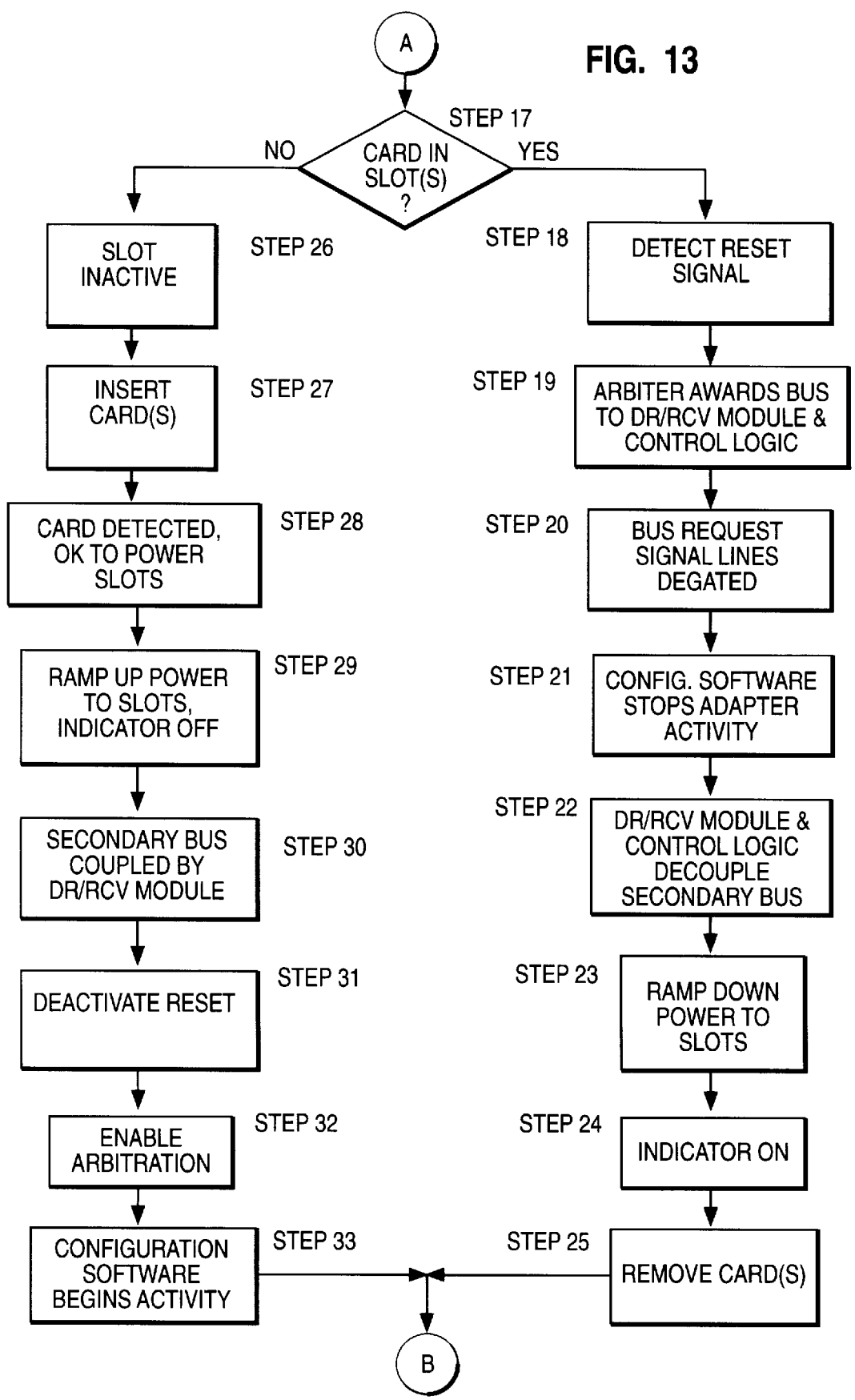

SECONDARY I/O BUS WITH EXPANDED SLOT CAPACITY AND HOT PLUGGING CAPABILITY

CROSS REFERENCE TO RELATED APPLICATIONS

"AUTODOCKING HARDWARE FOR ADAPTER CARDS", filed Nov. 2, 1995, Ser. No. 08/552,186, now U.S. Pat. No. 5,644,470.

"ADAPTER CARD SLOT ISOLATION FOR HOT PLUGGING", filed Nov. 2, 1995, Ser. No. 08/552,035, now abandoned.

"ERROR RECOVERY BY ISOLATION OF PERIPHERAL COMPONENTS IN A DATA PROCESSING SYSTEM", allowed patent application Ser. No. 08/862,579, which is a continuation of Ser. No. 08/556,887, filed Nov. 2, 1995, now abandoned.

BACKGROUND OF THE INVENTION

1. Technical Field

The present invention provides a method of extending an I/O bus to support additional adapter cards. The method of extension is by the use of a driver/receiver (DRV/RECV) module and direction control logic that determines the location of the master driving the bus signals and this information is then used to determine which way the DR/RECV (driver/receiver) module should drive the bus signals.

2. Description of Related Art

I/O buses such as the PCI bus use a bridge chip to extend the bus to support additional card connectors. The bridge chip receives the address from the bus containing the master and determines (by a set of address range registers) if it needs to provide the appropriate response signal sequences. Typically, this includes buffering the address, command, and data (in most cases) in the bridge chip prior to redriving the bus signaling sequence onto the other PCI bus.

Using additional bridge chips is one method of extending the PCI bus to include added slot capacity but it is also an expensive method of extending the bus.

Typical computer systems include a system board which includes a microprocessor and other application specific integrated circuits (ASIC), such as memory controllers, input/output (I/O) controllers, and the like, electrically connected to one another by wiring layers. Also, most computers include slots for additional adapter cards which can connect the chips on the adapter cards to the microprocessor and/or other chips on the system board, in order to provide additional function to the computer system. Typical functions that a user might add to a computer include additional memory, fax/modem capability, sound cards, graphics accelerator cards, math coprocessors, or the like. The slots included on the system board generally include in line electrical connectors having electrically conductive lands which receive exposed tabs on the adapter cards. The I/Os of the chips on the cards are connected to the tabs. The connector is then electrically connected to the microprocessor, or the like through the previously mentioned wiring layers.

In conventional computer systems, a user must power off the system and first remove the cover from the entire computer system before the additional card(s) can be accessed. This is true whether an existing card is being removed and/or a new card is being added to the computer. Often, it is a time consuming operation to remove and replace the cover of the computer system. Several metal screws must be removed and then reinstalled, and the cover frequently requires very precise alignment before it seats on the computer frame. Also, the actual installation of the card into the adapter slot can be a painstaking and time consuming operation, since the user is required to precisely align the card and slot, without the aid of any type of alignment device, and exert sufficient (but not too much) pressure for electrical contact to be made, without damaging the card or connector.

Therefore, it can be seen that a need exists for a computer system which would allow a user to change the hardware configuration of a computer by removing a feature card from and/or installing a feature card into a computer system without the need of removing the actual cover from the computer system, and powering down the entire system, or taking the computer off line. Additionally, a system would be advantageous that would assist the user in aligning the card and connector to ensure proper electrical connection and avoid damage to either component.

Also, cross referenced application, Ser. No. 08/552,186, now U.S. Pat. No. 5,694,470, provides an approach for extending a secondary I/O bus through modifications to the I/O architecture and the use of additional modified bus to bus bridges. This referenced applications does not address the problems inherent with modifying the bridge chips and the bus architecture, i.e. complexity associated with buffering the control signals. Thus, it can be seen that a need exists for a technique of providing an efficient method of providing additional I/O bus slots without the use of bus to bus bridges. Further, using off the shelf components to expand the I/O bus would be advantageous in developing computer systems that meet the price/performance requirements of the market place.

SUMMARY OF THE INVENTION

In contrast to the prior art, the present invention provides a computer system which supports an increase in the number of pluggable cards on the secondary I/O bus by using driver/receiver modules and direction control logic in place of more complex and more expensive bus to bus bridges.

Broadly, the number of pluggable cards on the I/O bus in a computer system is limited by the electrical loading of each card and the frequency of operations on the bus. Reducing the bus frequency provides more signal propagation time. The added signal propagation time supports the extension of the bus by driver/receiver modules and logic which controls the direction the driver/receiver modules drive the bus signals. The use of the driver/receiver modules is appropriate in a system where the full bandwidth of the bus is not needed. For example, the bandwidth of the 32 bit PCI bus is 132 Megabytes per second (MB/sec), when operated at 33 MHz.

When only a few additional cards are needed it may be sufficient to reduce the frequency. When a larger number of additional cards is required multiple sets of driver/receiver modules and associated control logic are used. This results in a larger number of cards than could be supported by only reducing the bus frequency.

The PCI bus has a minimum clock period (at a frequency of 33 MHz) of 30 nanoseconds (ns). Ten ns is reserved for bus signal propagation time. By reducing the bus clock frequency to 25 MHz the clock period is increased by 10 ns (to a total of 40 ns). This provides the time for the bus signal to propagate across the second PCI bus. The driver/receiver module also has some signal propagation delay. To allow for this delay from the driver/receiver module (approximately 5 ns) the bus frequency may have to be reduced to the 22 to 25 MHz range (depending on the number of card connectors on both the primary bus and the additional secondary bus).

With careful board layout it should be possible to connect eight driver/receiver modules and associated direction control logic to the primary PCI bus. To do this, the primary bus will be limited to two additional soldered devices (i.e. the host bridge and one other device). At a frequency of approximately 22 MHz, there could be up to a total of thirty-two cards, with zero on the primary bus and four cards on each of the 8 secondary buses. The total number of slots that can practically be packaged on a single planar may be less than 32. The total number of slots in a system will be a trade-off between physical packaging limitations and clock frequency. Peer data transfers (data transfers between I/O devices on different secondary buses) are limited within a secondary bus or between a secondary bus and the primary bus. Although, peer data transfers can be supported between secondary buses with an additional decrease in the bus frequency.

The second aspect of this invention adds function to the direction control logic to provide the added capability of disconnecting an I/O card slot from the rest of the bus so a card can be inserted or removed while the rest of the system continues to function normally. That is, the present invention also provides a computer system which allows a user to remove or install feature cards (i.e. change the hardware configuration of the computer) without powering down and/or removing the cover of the entire computer system. The present invention allows individual connectors to be disabled such that specific feature cards can be removed or replaced, without the need for powering down the entire computer system.

The computer system implementing the present invention includes additional control logic and at least one connector slot for receiving a feature card, that performs specific functions such as I/O, memory, or the like. When alteration of the hardware configuration is desired a user causes a reset control signal to be issued from the control logic. This reset control signal is used to initiate the functions of ceasing data processing activity for the card to be removed, decoupling the slot from the bus and causing the electrical power to be gradually decreased. Once the new card is mechanically installed in the connector, then power is brought up, the slot is coupled to the bus and the reset signal from the control logic is deactivated. This allows the configuration software to begin data processing activity with the new card. In this manner, an individual slot, or bank of slots can be isolated from other slots in the computer system, such that particular adapter cards can be changed without the need to power down the entire computer system.

In accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 3 is a top view taken along section line A—A of FIG. 2 of the adapter card and guide member of the present invention;

FIG. 4 is an elevation view of the adapter card and guide member of the present invention taken along section line B—B of FIG. 2;

FIG. 5 is a perspective view of a computer system cover showing the slots which accommodate the adapter card and guide member of the present invention;

FIG. 13 is a flow chart showing the steps needed to remove, install or replace the cards in a bank of slots.

DETAILED DESCRIPTION OF THE PREFERRED EMBODIMENTS

Figure 1:
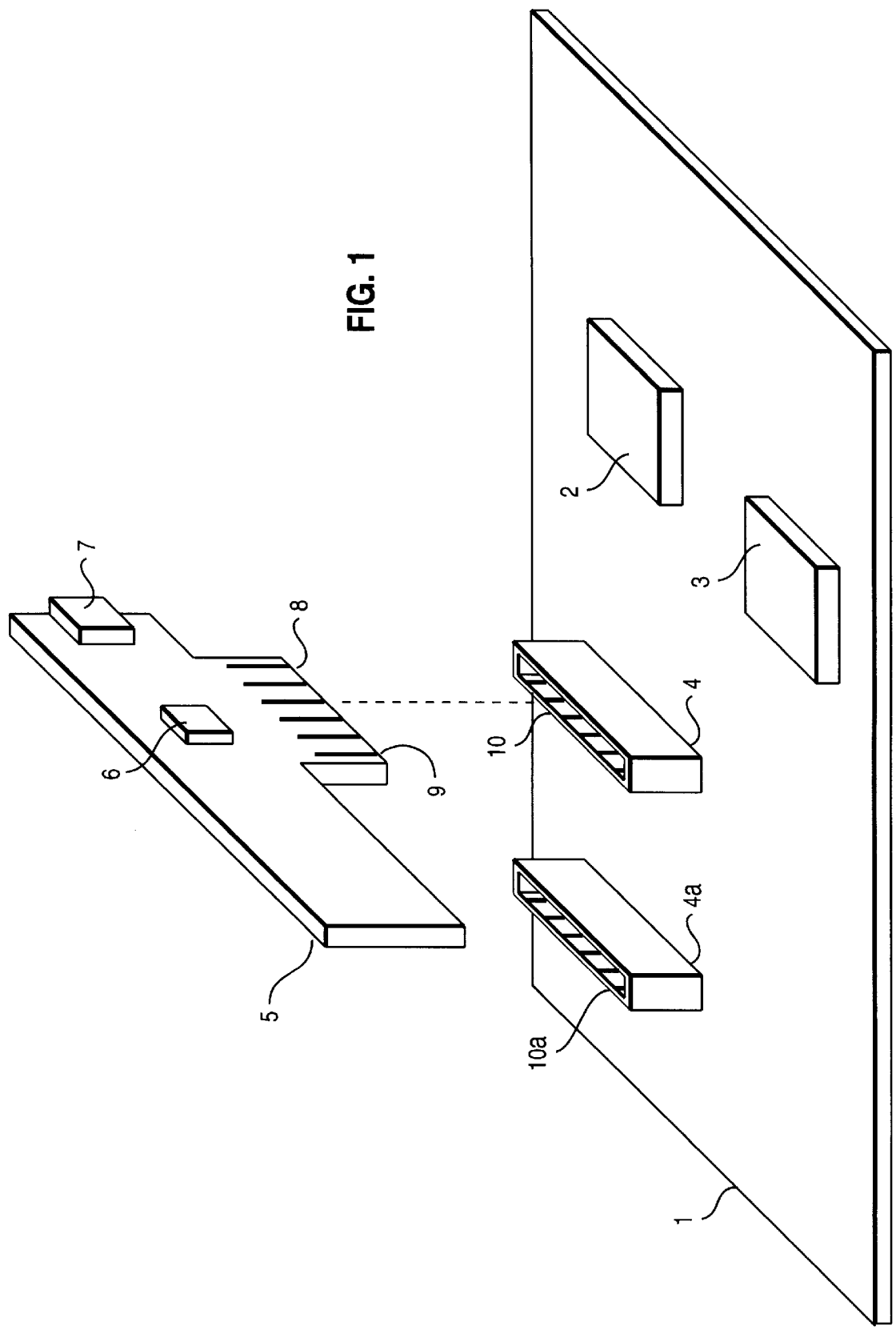
FIG. 1 is a perspective view of a system board and an adapter card, and the mechanical relationship therebetween.

Referring to FIG. 1, a perspective view of a system board 1 and feature, or adapter, card 5 is shown. Board 1 includes various integrated circuit chips such as a microprocessor 2, e.g. a PowerPC microprocessor available from the IBM Corporation (PowerPC is a trademark of IBM) and other application specific integrated circuits 3, such as a memory, I/O controller or the like. In line connectors 4 and 4a are also shown attached to system board 1. These connectors are electrically connected to the ICs on board 1 through wiring layers which are present in the system board. Electrically conductive lands 10 are present in connectors 4 and 4a which will interconnect with electrically conductive tabs on a feature card. The feature card 5, also known as device 5, is shown perspectively and includes an interconnection portion 8 having conductive tabs 9 therein. These tabs 9 will contact lands 10 in connector 4 such that electrical connection can then be made between the various components on system board 1 and the chips present on feature card 5. Chips 6 and 7 on feature card 5 could be any one of a number of integrated circuits that will provide additional function to the computer system. For example, these chips 6 and 7 may be memory, graphics accelerator, math co-processor, modem, or the like ICs. Again, there are wiring layers present in feature card 5 which will connect chips 6 and 7 on feature card 5 with microprocessor 2 and chip 3 on the system board when card 5 is inserted into connector 4. Those skilled in the art will understand that card 5 and system board 1 can be any one of a number of substrates, which include layers of electrically conductive, and alternating insulating material, connected to one another through vias. The layers in board 1 and card 5 are brought out to surface pads and then connected to the I/O points on the various chips by using one of the many interconnection methods, such as controlled collapse chip connect (C4), solder ball connect (SBC) wire bonding, surface mount technology (SMT) or the like.

Figure 2:
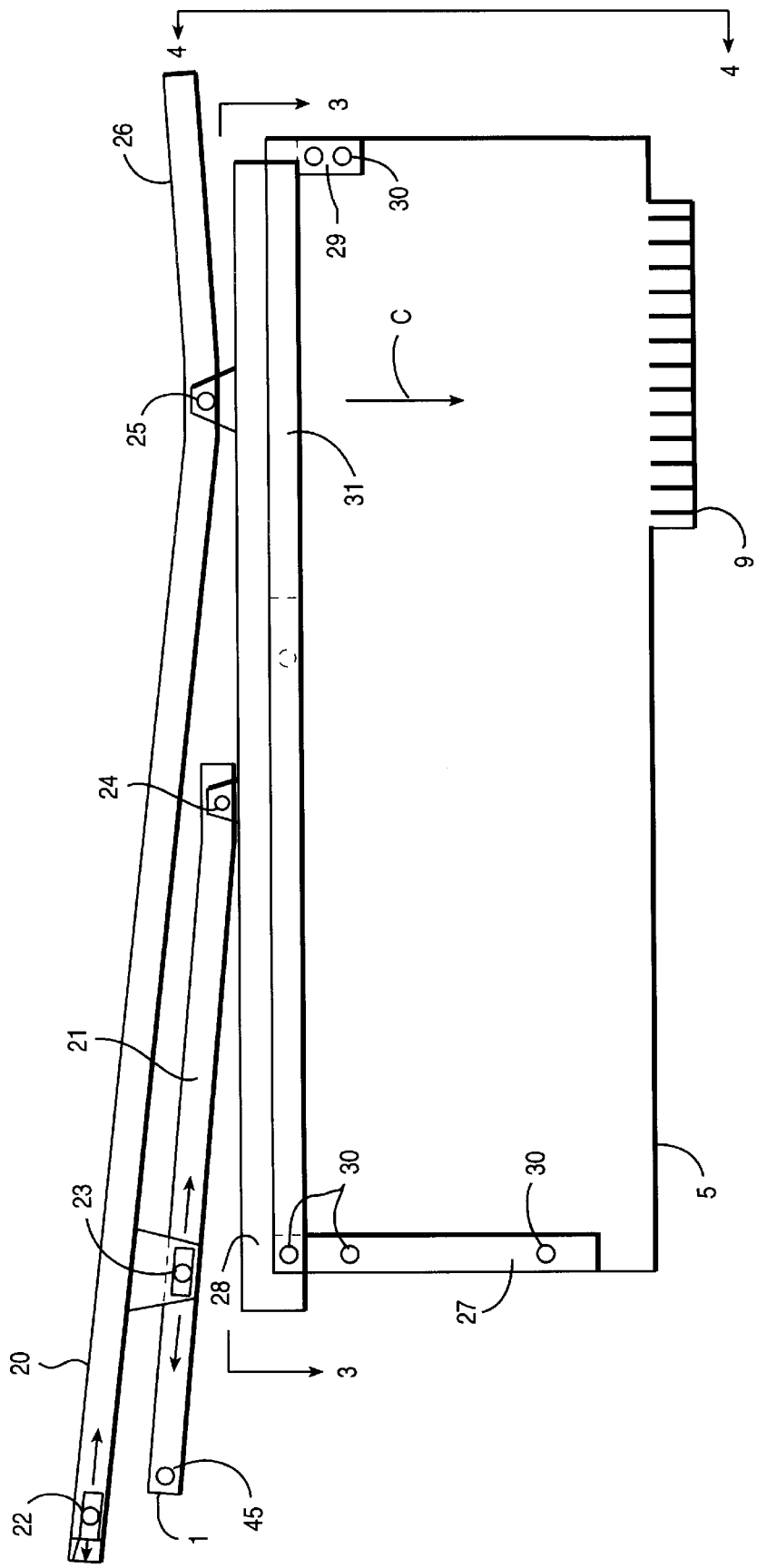
FIG. 2 is an elevation view of an adapter card with a corresponding attached guide member.

FIG. 2 shows a preferred embodiment of the guiding means of the present invention. Adapter card 5 is shown having electrically conductive tabs 9 in the same manner as described with regard to FIG. 1. Additionally, a card guide 31 is shown which is affixed to card 5 by friction fit, clamping, screws, or other attachment means. It should be noted that guide 31 can be shortened, or otherwise modified to accommodate one-half sized adapter cards, which are common in the industry. The invention will be described using a full sized adapter card, but it should be understood that a half-size card is contemplated by the scope of the present invention. Guide 31 includes end portions 29 and 27 which are affixed to the ends of adapter card 5 by attachment means 30.

A guide rail 28 is provided which slidably receives the card guide 31, as shown in greater detail in FIG. 4. At least one shoulder portion 33 is included which fits, or conforms with the interior surface of guide rail 28 (see FIG. 4). Pivot points 24 and 25 are rigidly affixed to guide rail 28. Pivot 25 is also rotatingly attached to an elongated force transfer member 20 which has a lever portion 26 (see FIG. 2). A second force transfer member 21 is rotatingly attached at one end to pivot 24 and rotatingly attached, at substantially the other end, to a pivot 23 which is rigidly affixed to member 20. The end of force transfer member 20, opposite lever portion 26, is rotatingly attached to a pivot member 42 which is rigidly affixed to frame member 43, or the like, as shown in FIG. 5. It should be noted that pivot points 22 and 23 also include a slotted opening about pivot pins inserted therein to provide some sliding movement (in the directions shown by the arrows in FIG. 2) as card 5 is removed from, or inserted into, connector 4 by raising or lowering the card.

It can be seen that the arrangement of FIG. 2 provides downward vertical motion of card 5, as shown by arrow C, such that electrical tabs 9 will seat and connect with in-line connector 4 of FIG. 1. Those skilled in the art will understand that if card 5 were directly attached to a pivot, then tabs 9 would approach connector 4 at an angle and it would be extremely difficult to insert card 5 into connector 4 and make reliable mechanical and electrical connection.

As shown in FIG. 2, when force in exerted upwardly on lever 26 to disengage an adapter card, there is an upward vertical force at pivot 25, which is directly transferred to card 5 at a point in alignment with electrical connection tabs 9. At the same time, an upward force is applied to member 21 through pivot 23 and transferred to card 5 at pivot point 24. This provides a slight upward force on card 5, which prevents it from rotating as the card is removed from connector 4 and allowing the card to become easily decoupled from the connector, both electrically and mechanically. The process is reversed when it is desired to insert a card 5 into a connector 4 on system board 1. After guide 31 is attached to card 5, it is slid into guide rail 28. Downward force is then applied to lever 26 and this force is transferred to card 5 through pivot 25. Since pivot 25 is aligned with tabs 9, this downward force is exerted vertically and directly on the connection tabs. The downward force on lever 26, also provides a downward force on member 21 via pivot 23. This force is then transferred as a slight downward force to card 5 through pivot 24 to prevent the adapter card from rotating as it approaches connecter 4. Thus, as described above, it can be seen how the apparatus of FIG. 2, allows an adapter card to be vertically inserted and removed from an in-line connector resident on a computer system board. The previous description is one preferred embodiment of the present invention, however, those skilled in the art will readily comprehend how other mechanisms, such as cam gears and the like could be used to provide an apparatus that would allow vertical insertion and removal of an adapter card from a connector.

FIG. 3 is a view of card 5, taken along line A—A of FIG. 2 showing how guide member 31, along with portions 27 and 29 are attached to the card using attachment means, such as screws 30, or the like. FIG. 4 is a side view of card 5, taken along line B—B of FIG. 2. This view shows guide member 31 with its end portion 29 and attachment means 30. As noted above, the shoulder portion 33 of guide member 31 conforms to the interior surface 35 of guide rail 28 such that guide 31, with card 5 attached thereto, can be longitudinally inserted into guide rail 28 in a slidable disposition. Pivot means 25 is also shown in FIG. 4 and affixed to guide rail 28 in the same manner as shown in FIG. 2.

FIG. 5 is a perspective view of a computer system having a cover 40 with slots 41 formed therein. Two slots 41 are shown in FIG. 5. However, it is contemplated that any number of slots 41 can be formed in cover 40 in order to accommodate the desired number of adapter cards 5. A frame member 43 is shown which is affixed to a system board 1 (or another suitable support) internal to the computer. Pivot means 42 are also shown disposed on frame member 43 and which are rotatingly attached to pivot point 22 of the guide means of FIG. 2. Also, pivot point 45 is rotatingly attached to frame member 43 or other suitable support to provide additional mechanical support for the guiding means of FIG. 2. When cover 40 of FIG. 5 is disposed to encompass system board 1 of FIG. 1, the slots 41 will be in aligned relation with connectors 4 and 4a. Guide rail 28 is slid into frame member 43 and pivot point 22 is connected to pivot 42, while pivot point 45 is connected to pivot 46. In this manner, the card guiding means of FIG. 2 is also aligned with connectors 4 and 4a of system board 1. Guide member 31 is then attached to an adapter card 5 and the entire assembly is slid into guide rail 28 with lever 26 extending outwardly from slot 41. To electrically install the adapter card 5 in the computer system, downward pressure is placed on lever 26 until the electrical tabs 9 of the adapter card 5 are in electrical connection with, for example, lands 10 of connector 4. To remove a card, or change one adapter card for another, the process is reversed. That is, upward pressure is placed on lever 26 and tabs 9 of card 5 are disconnected from lands 10 of connector 4. The card 5 with guide rail 31 is then slid out of guide rail 28 and a new, or replacement card is slid into guide rail 28. Again, downward pressure is exerted on lever 26 to install the new card mechanically and electrically.

It can readily be seen that the present invention will provide a user with the ability to change the computer hardware configuration by allowing adapter cards 5, such as a fax/modem, graphics accelerator, or the like, to be installed, or replaced in a computer system without the need for removing the computer cover 40. A computer system user merely needs to electrically isolate, or disconnect the connector 4 from the CPU 2 and then install, remove or replace the adapter card 5. In personal computers, the electrical isolation may include merely powering off the machine, while the card is installed or removed. In more sophisticated systems, it may be necessary to try and isolate the particular connector, or a group of connectors where a new, or different card is to be installed, without electrically disconnecting the remaining connectors.

In most personal computers, workstations and servers the normal procedure for repairing or upgrade action in the I/O subsystem is to turn off the power, open the covers to gain access to the I/O area (connectors 4) and install, remove or replace the adapter card that is bad, or being upgraded. The covers are then replaced and the power restored. Particularly, in server systems, it is becoming increasingly unacceptable to handle I/O repairing and upgrade actions in this manner, since many users are tied into the server across complex networks and would be shut down during the repair/upgrade action.

Some mainframe and high end server machines today offer an expensive on line maintenance capability by providing redundant systems. The present invention provides a relatively inexpensive and simple way to perform on-line maintenance of I/O subsystems which allow I/O cards to be replaced without opening the covers of the computer, and while allowing the system and other parts of the I/O subsystem to continue processing operations.

Figure 6:
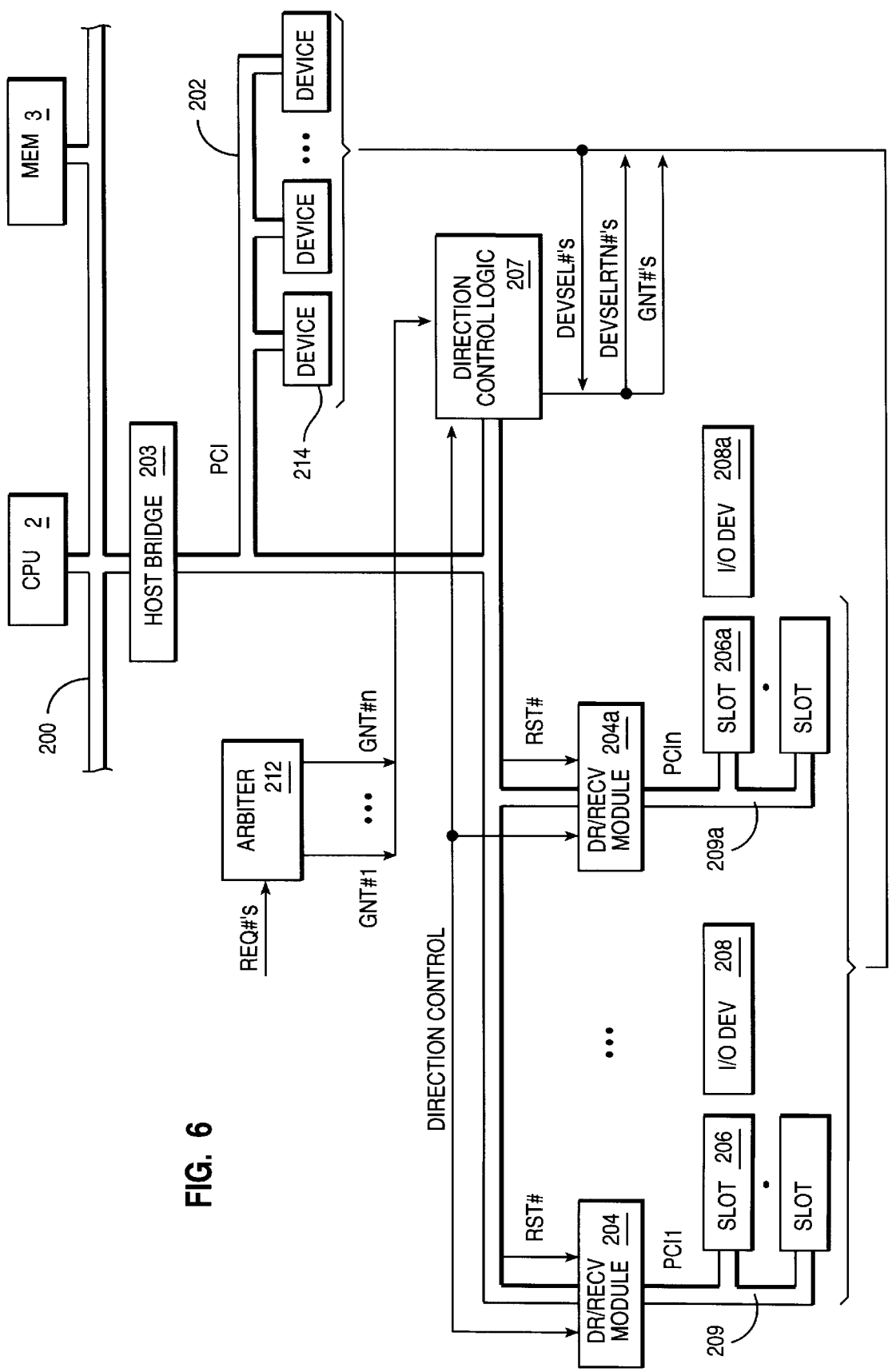
FIG. 6 is schematic diagram of a computer system having a system bus connected to an I/O bus through a host bridge, wherein a number of adapter slots are electrically connected to the I/O bus by use of sets of driver/receiver modules and direction control logic.

FIG. 6 shows the electrical connection for the various components in an I/O subsystem of the computer system. CPU 2 and memory 3 are shown connected to system bus 200. A host bridge chip 203 is shown and provides an interface between system bus 200 and a secondary, or mezzanine bus 202 which may be used for input/output (I/O) operations, such as the PCI bus. FIG. 6 shows a PCI bus and PCI host bridge chip, and for clarity, the present invention will be described using a PCI bus, but it is to be understood that the present invention contemplates the use of any I/O bus, or other secondary bus. PCI host bridge chip 203 contains logic and functionality that enables the bus protocols to be translated between system bus 200 and bus 202, including interrupt handling, message passing, arbitration, snooping and the like.

Secondary bus 202 is connected to at least one driver/receiver module such as modules 204, 204a. This module provides the interface between the I/O bus 202 and the actual adapter slot(s) 206, 206a which includes the connector and additional logic that is connected to module 204 by expanded PCI bus 209. Slot 206 will receive an I/O device 208. It should be noted that most computer systems will include more than one I/O slot, as shown in FIG. 6. The additional slots are represented by adding the letter "a" to the reference numerals which are used to describe the components of the present invention. The present invention adds additional logic as shown by reference 207, but does not require modification of the PCI architecture. The PCI architecture and specifications are available from the PCI Special Interest Group (PCI-SIG), hereby incorporated by reference.

As noted previously, in order for a system to contain additional adapter cards the driver/receiver modules 204, 204a are necessary to limit the capacitive load and signal trace length to a value compatible with the selected bus clock frequency and therefore the clock period. The signal propagation time on bus 202, the propagation time of the driver/receiver module 204, the propagation time of bus 209, plus 20 nanoseconds must be less than or equal to the bus clock period at the selected bus clock frequency. An examination of the PCI bus specification will show that 20 nanoseconds of the clock period are reserved for other assigned delays associated with driving a signal out of a source device (e.g. adapter card) to the receiving device (e.g. another adapter card).

Figure 7:
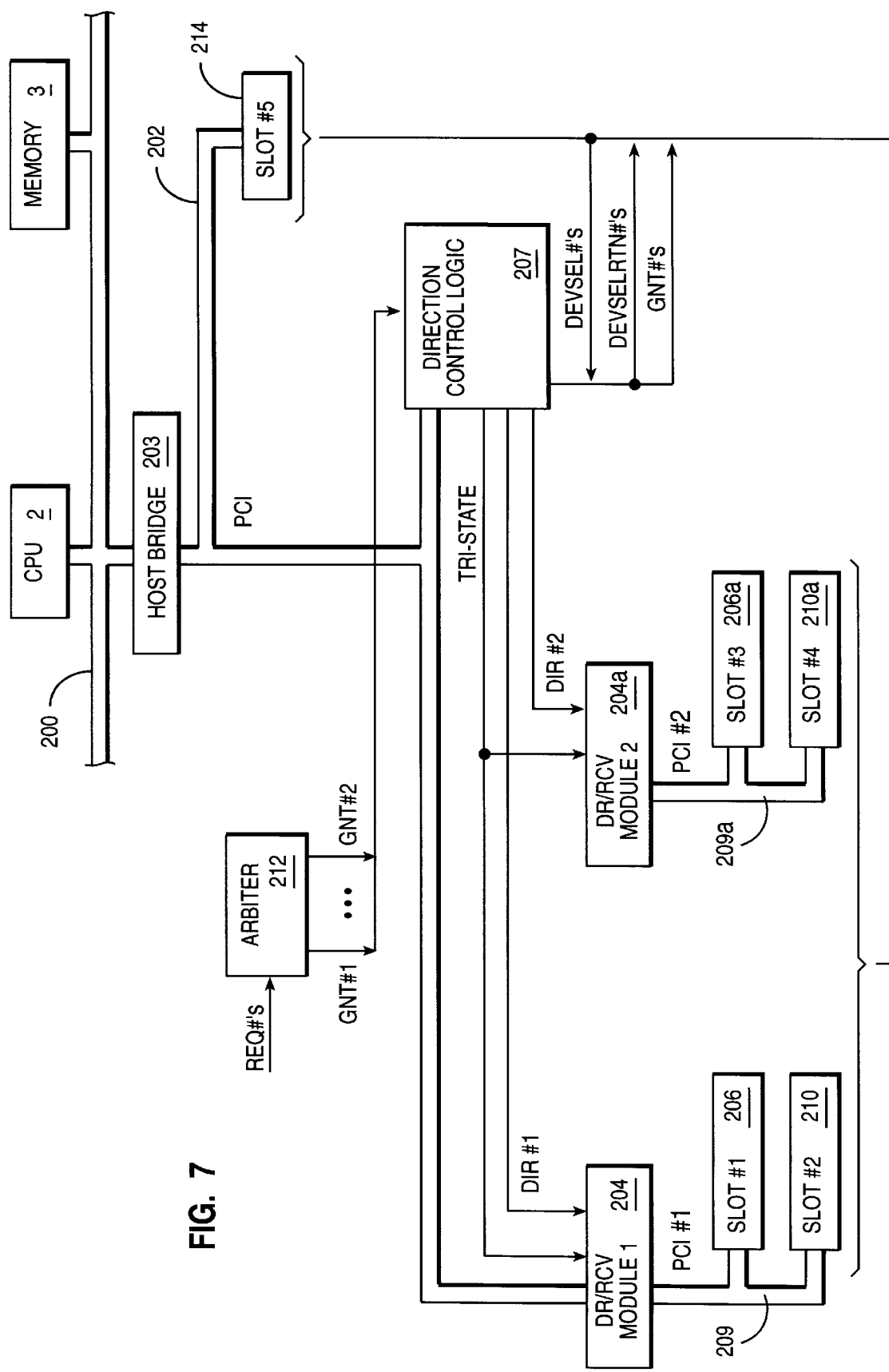
FIG. 7 is a schematic diagram showing additional adapter card slots supported by using the driver/receiver modules to extend the PCI bus.
Figure 8:
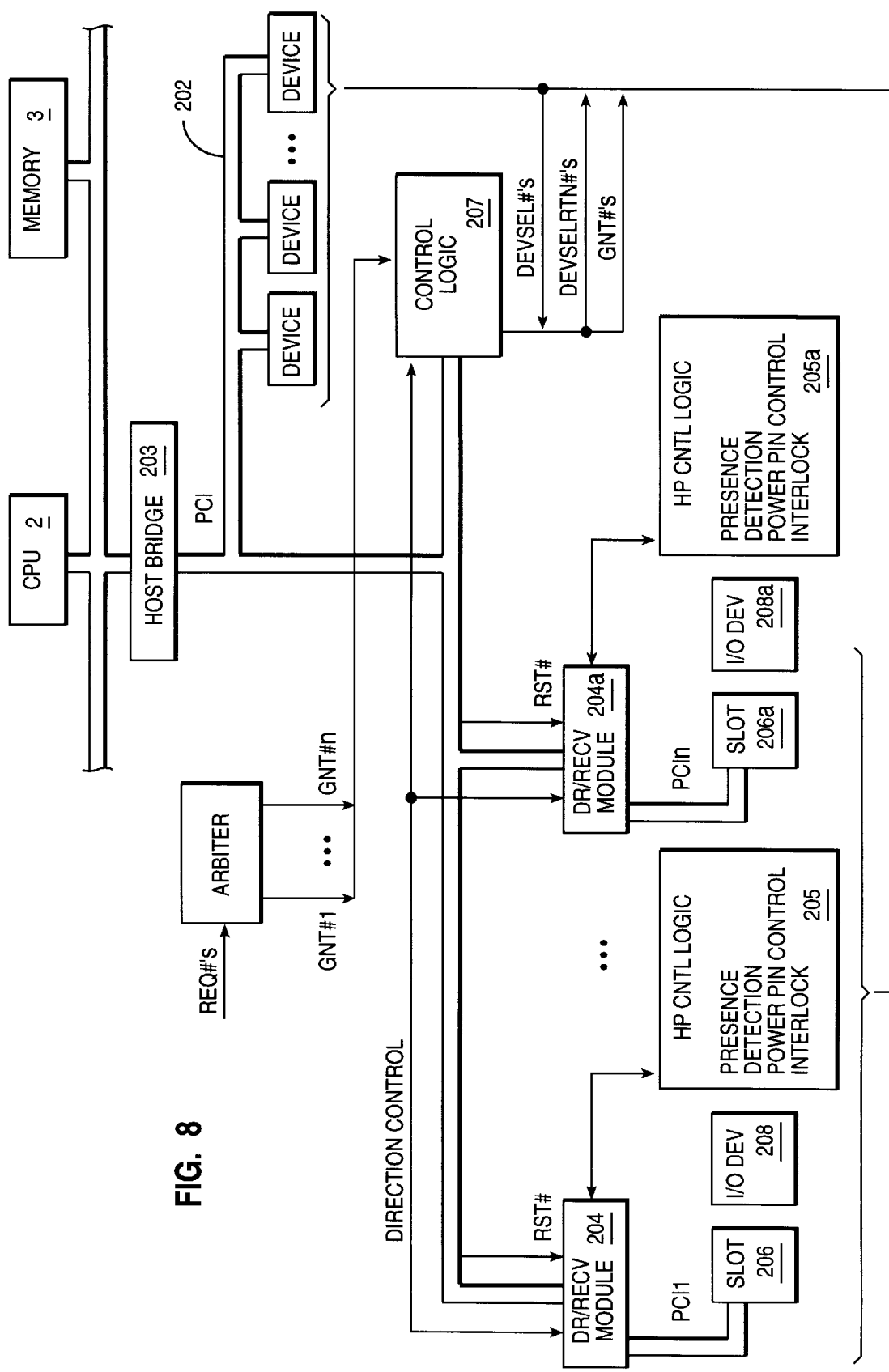
FIG. 8 is a schematic diagram showing another preferred embodiment of the present invention wherein a set of PCI slots can support hot plugging of PCI cards by providing slot isolation and control of those slots via use of driver/receiver modules and hot plug control logic.

FIG. 7 shows the components of the present invention, which allows additional adapter cards to be supported by using the first driver/receiver (DR/RECV) module 204 and a second driver/receiver module 204a to extend the PCI bus 202 to a first expanded PCI bus 209 and a second expanded PCI bus 209a. The data transfer sequences conform to the PCI bus architecture. The direction control Logic 207 monitors activity on the bus 202. When a bus idle condition exists and a GNT# signal is asserted by the arbiter 212 the direction control logic 207 then determines the location of the next master device (on PCI bus 202 or expanded PCI buses 209, 209a). The GNT#1 through GNT#5 signals are associated with slot#1 through slot#5, respectively. Of course, the present invention is not limited to five slots and it should be understood that this number is used for the purposes of illustration not limitation. When GNT#1 or GNT#2 is asserted, the direction control logic 207 causes DR/RECV module 204 to allow the transfer of information between bus 209 and the PCI bus 202 as if bus 209 were an extension of bus 202. This is accomplished by control logic 207 issuing a signal DIR#1, during the address phase of the transaction, in response to the receipt of GNT#1 or GNT#2. The DIR#1 signal enables the DR/RECV module 204 to send and receive PCI control signals and to steer information from PCI devices in slots 206, 210 onto PCI bus 202. Alternatively, information can also be steered from PCI bus 202 onto slots 206, 210 on bus 209. At the time, direction control logic 207 detects that the transaction is a write (and the target is on PCI 202) the direction steering remains the same for the remainder of the transaction. But, when the direction control logic 207 detects that the transaction is a read, it uses DIR#1 to steer the data portion of the information on PCI bus 202 toward PCI bus 209. As can be seen from this example, the bus is steered away from the master on bus 209 during the address phase of the transaction and during the data phase of the transaction when the transaction is a write. The bus information is steered away from the master during the address phase of a read. The data on bus 202 is steered toward the master on bus 209 during the data phase of the read for only the bus, e.g. 202, containing the target. The location of the target is indicated by the DEVSEL#1 through DEVSEL#5 signals. The signal lines identified as carrying device select signals (DEVSEL#S) and grant signals (GNT#S) in FIGS. 6, 7 and 8 are standard PCI signals. The device select return signals (DEVSELRTN#S) are return signals responsive to the dEVSEL#S) signals.

The present invention also contemplates providing peer to peer support for devices on different PCI buses, i.e. from a device in a slot on bus 209 to another device in a slot on bus 209a. In this case, the frequency of the system clock must be reduced and logic provided to steer information from one PCI but to another. For example, a frequency divider circuit could be used to reduce the clock rate. Additionally, steering logic such as direction control logic 207 could be used, and modified to steer information between secondary PCI buses, e.g. 209 and 209a, rather than between a primary bus and a secondary bus. e.g. 202 and 209.

FIG. 8 shows the electrical connections for the various components in an I/O subsystem implementing another aspect of the computer system of the present invention. Again, CPU 2 and memory 3 are shown connected to system bus 200 with a host bridge chip 203 providing an interface between system bus 200 and I/O bus 202 used such as the PCI bus. Although FIG. 8 shows a PCI bus and PCI host bridge chip, the present invention contemplates the use of any I/O bus. PCI bridge chip 203 contains logic and functionality that enables the bus protocols to be translated between system bus 200 and I/O bus 202, including interrupt handling, message passing, arbitration, snooping and the like.

I/O bus 202 is connected to at least one DRV/RECV module 204. This module provides the interface between the I/O bus and the actual adapter slot 206 which includes a connector 4 and additional logic. Slot 206 will receive an I/O device 208. This preferred embodiment of the present invention adds additional control logic as shown by reference numerals 205, 205a but does not require any modifications to the system which would make it non-compliant with the PCI architecture. It should be noted that most computer systems will include more than one I/O slot and/or device, as shown in FIG. 8. The additional slots are represented by adding the letter "a" to the reference numerals which are used to describe the components of the present invention.

As noted previously, in order for a system user to install, remove or replace an adapter card, the connector, or slot (including a bank of slots), must be isolated such that all of the processing activity at that slot, or bank of slots is ceased. One way to stop all activity is to merely turn the machine power off. However, this is often not practical for server type machines which interconnect many client computers. This is particularly true in a fault tolerant, or high availability system. Also, with the availability of multitasking systems, it may not be desirable to turn off the power of a single computer, when a particularly important activity is taking place. For example, a personal computer equipped with a fax/modem may need to remain powered on in order to receive a transmission. In this case, it would be advantageous to be able to deactivate a particular I/O slot(s), with the remaining slots being in an active state. The present invention allows a user to replace a particular adapter card without the need of powering off a system, whether it is a server or personal computer.

Figure 9:
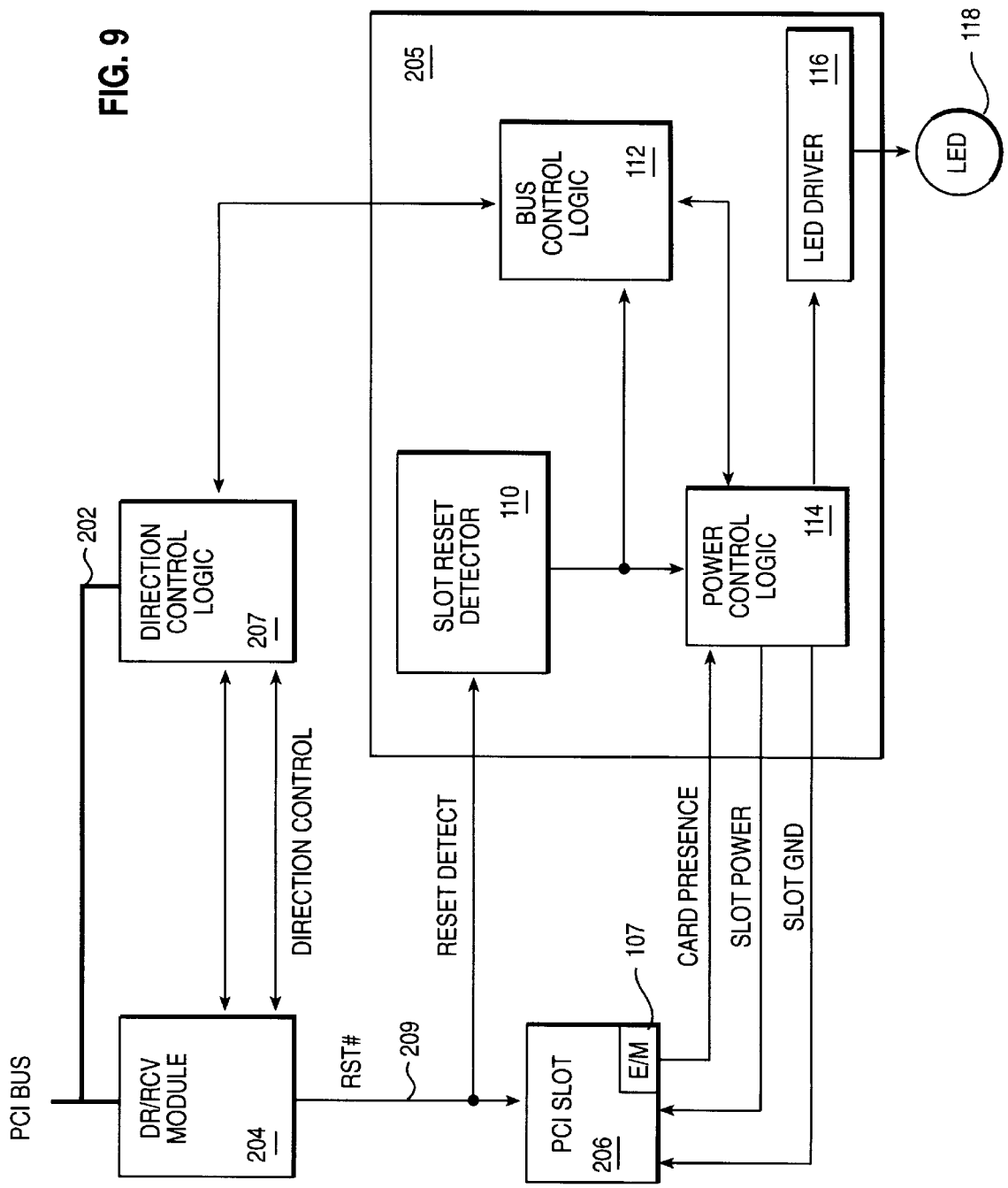
FIG. 9 is a schematic diagram showing control of an individual PCI card slot for the purpose of slot isolation and power control to allow removal and insertion of I/O cards while the other PCI buses in the system remain operational.

FIG. 9 shows the components of the present invention, which allow adapter cards to be installed, removed or replaced, without the need to power off the entire system. The I/O bus 202, e.g. a PCI bus, is connected to DR/RECV module 204 plus its direction control logic, and in combination with the additional control logic 205, is used to control a single PCI slot 206. It should be noted that slot 206 is considered the entire electrical and mechanical functional interface between secondary bus 209 and module 204. This interface includes connector 4 as one portion, along with various other electrical and mechanical components, such as an electromechanical sensing device 107, as discussed below. One DRV/RECV module 204 and direction control logic 207 in conjunction with associated control logic 205 is used to control a slot(s) 206, 210. Of course, a combination of these elements may be replicated based upon the number of I/O slots present in the computer system. In this manner each slot can be selectively reset with a RST# signal, and power removed from the slot when an I/O card is to be removed, replaced or installed.

The planar, or system board 1, will be modified to include the DRV/RECV module 204 for each set of I/O slots, e.g. 206, 210. The DRV/RECV module 204 is then used to isolate the secondary bus 209 and slot 206 from the remainder of I/O bus 202. When the slot is empty, there is no power applied to the slot, such that a new card can be installed therein. If an I/O card is to be removed, it is first reset to assure that the adapter is not active during removal. The DR/RECV module 204 with direction control logic 207 will take the slot 206 off line, and with the aid of additional control logic, remove power from that card at the time it is reset. The card is then mechanically removed, as previously described. Also, electromechanical means, such as a solenoid switch, or the like, can be provided to interlock the I/O card to prevent the card from being removed while power is applied to the slot.

For I/O card insertion, the card is inserted into the machine (the guide means, or the like previously described may be used). Once the card is in place, the system is configured to identify and initialize the new I/O adapter card. Until the newly installed card is configured, the card slot 206 is electrically isolated from the I/O bus 202. When the card is configured, the logic on the planar provides for a ramp up of power to the power pins on the connector 4. During the upgrade/repair action, only the I/O slot being reconfigured would be affected, allowing the system and other portions of the I/O subsystem to remain in operation. It should be noted that above described operation does not require a change to the PCI (or other I/O bus) specification or architecture itself. That is, the present invention can be totally implemented without any modification to the I/O bus architecture.

Control logic 205, as shown in FIG. 9 includes slot reset detector 110, bus control logic 112, power control logic 114 and LED driver 116. Also, a light emitting diode (LED) 118 is shown which is controlled by LED driver 116.

The preferred embodiment of FIG. 9 has been described as isolating an individual slot, however, the scope of the present invention includes isolating substantially any number of slots, i.e. a bank of slots from other slots or banks of slots. By isolating a bank of slots, a single DRV/RECV module 204 can be used to control the bank, thus eliminating the need to provide one DRV/RECV module 204 for each slot 206. Of course, some flexibility is lost when a single module controls more than one slot, however, this may be desirable in some applications systems where it is desired to reduce system costs and still be able to change cards without deactivating other system functions.

One skilled in the art will understand that other means can also be used to implement the functions needed for hot plugging, such as communication with the slots, adding or removing power from a slot and the ability to stop/restore data processing activity at a particular slot. For example, use of power domain control that is also used to reduce power utilization by a system by removing power from inactive devices, is contemplated by the present invention.

Figure 10:
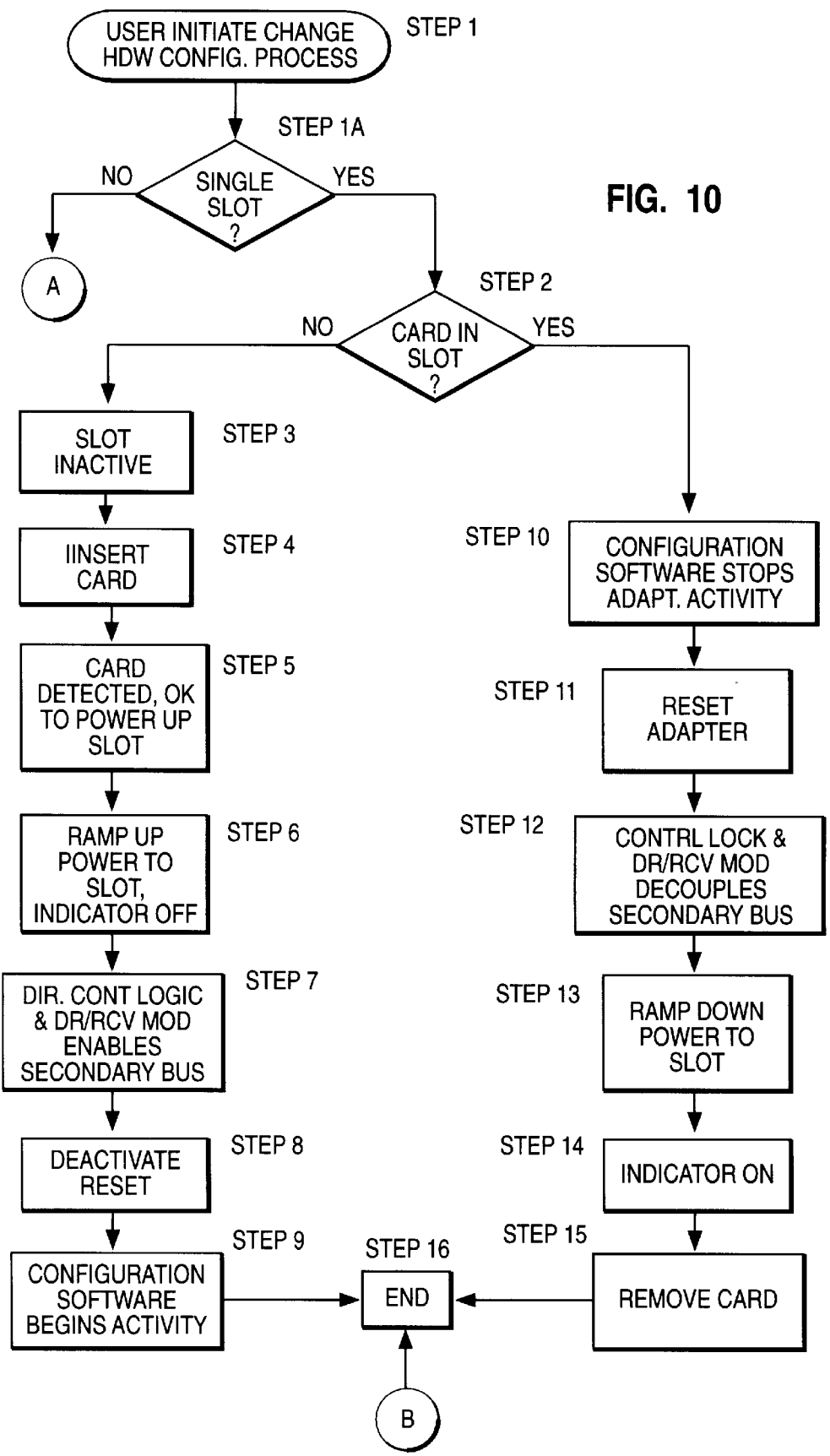
FIG. 10 is a flow chart showing the various process steps implemented by the present invention to hot plug the adapter cards into the I/O slot(s)

FIG. 10 is a flow chart that will be used in conjunction with FIG. 9 to explain the electrical operation of the present invention.

In a first case, it will be assumed that there is an existing adapter card 5 in a PCI (or other I/O protocol) slot 206 which is to be removed. Referring to FIG. 10, at step 1 the user initiates (by a sequence of keystrokes, selecting an icon with a mouse, or the like) the process for changing the system hardware configuration by removing, replacing or adding an adapter card. The process then determines whether a single adapter slot, or a bank of slots, controlled by a single DRV/RECV module 204, is present in the system. If a bank of slots are present, then the method proceeds to step 17 of FIG. 13 (discussed below). If, it is determined at step 1a, that a single slot is present, then step 2 determines whether there is a card present in slot 206. Electromechanical sensing device 107 provides the card presence signal to logic 114. In this example, the process will determine that a card exists in slot 206, since it is being assumed that a card is being removed. The user will initiate this process by inputting commands, or the like to the computer system, via a keyboard, mouse, stylus, or other I/O device. These commands may require the user to provide certain information, such as which one of a plurality of slots 206 is to be re-configured, or the like.

At step 10, the operating system, such as the Disk Operating System (DOS), OS/2, AIX, or the like (OS/2 and AIX are trademarks of IBM Corp.) causes all data processing activity between the adapter 5 and the remainder of the computer system to be ceased. Subsequently, a reset RST# signal is issued from DRV/RECV module 204 to the I/O slot 206 (step 11). The RST# signal is also sent to reset detector 110, which in turn transmits a control signal to bus control logic 112. At step 12, the DRV/RECV module 204 decouples the secondary bus 103 from the primary I/O bus 202. This decoupling is accomplished by a control signal which is sent from bus control logic 112 to direction control logic 207. Based on the detection of the RST#, signal slot reset detector 110 also sends a control signal to power control logic 114, indicating that the power to slot 206 should be gradually reduced (ramped down). The power is then decreased at step 13.

Figure 11:
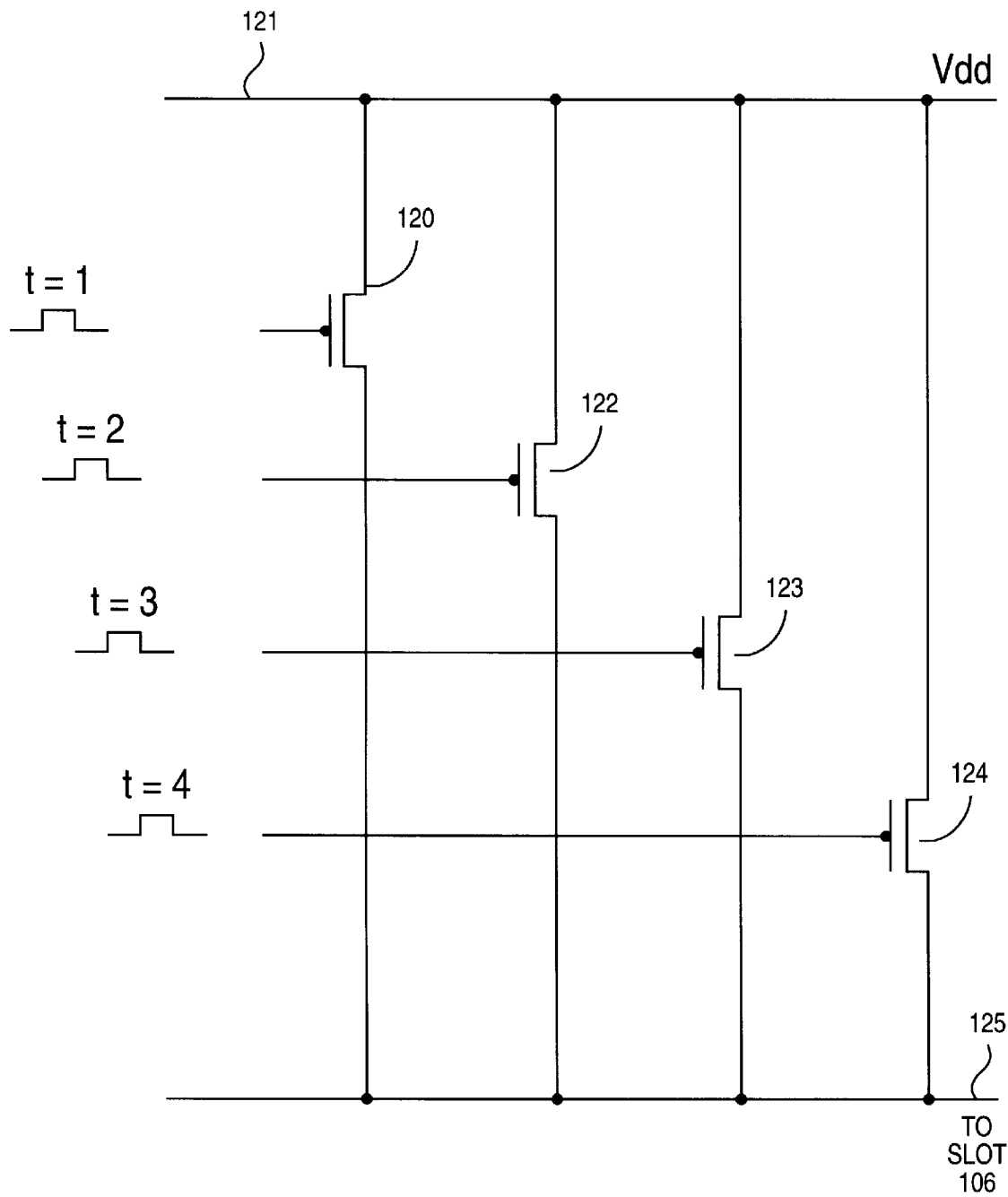
FIG. 11 is a schematic diagram showing one example of a circuit that could be used by the present invention to ramp up or down the power to an adapter card slot.

FIG. 11 shows one embodiment of a circuit which could be used by power control logic 114 to ramp the power to slot 106 up and/or down. The voltage Vdd is shown on rail 121 and connected to N-type transistors 120, 122, 123 and 124 (N-type transistors conduct electricity when a voltage, i.e. logical 1 is applied to their gate). Each of these devices will have a different threshold voltage and present a different resistance when turned on, such that the voltage drop across each of the transistors will be different. In the embodiment of FIG. 11, the devices will be sized where transistor 120 will have a large voltage drop and each of transistors 122, 123 and 124 will have a successively smaller voltage drop. For example, if Vdd is assumed to be 3.3 volts and transistor 120 has a voltage drop of 2.5 volts, then at t=1 the voltage on rail 125 will be Vdd−2.5=0.8 volts. If transistor 122 is sized to give a threshold voltage drop of 1.5 volts, then at t=2, the voltage on rail 125 will be 3.3−1.5=1.8 volts. Assuming for this example that transistor 123 has a threshold voltage of 0.5 volts, then at t=3, the voltage on rail 125 is 3.3−0.5=2.8 volts. And, it will be assumed that transistor 124 has a threshold voltage of substantially 0.0, such that at t=4, the voltage on rail 125 is 3.3−0=3.3 volts, or Vdd. Thus, it can be seen how from time t=1 to t=4, the voltage on rail 125, which is connected to slot 106 is gradually increased (ramped up) from 0.8 volts to 3.3 volts. When, it is desired to gradually decrease the power to slot 206 (ramp down), the process is essentially reversed. In the steady state condition, transistor 124 is turned on such that Vdd is provided to slot 206. To decrease the voltage on rail 125, transistor 124 is turned off by removing the voltage from its gate, and transistor 123 is turned on. Thus, 2.8 volts is then on rail 125, due to the threshold voltage of 0.5 volts from device 123. During the next time period, transistor 123 is turned off and device 122 is turned on, and a voltage of 1.8 volts will be on rail 125 because of the 1.5 volt threshold of device 122. Next, transistor 122 is turned off and transistor 120 is turned on placing a voltage of 0.8 volts on rail 125 due to the 2.5 volt threshold of transistor 120 (step 13). Of course, those skilled in the art will easily understand how the pulses at t=1 to t=4 can be varied by a clock generation circuit, and that additional transistors can be added to provide a more gradually sloping transition at slot 206 from no power (voltage=0) to fully powered (voltage=Vdd). Typical devices in slot 206 may require the voltage to be powered down to 0.2 volts. Those skilled in the art will understand how a wide range of voltage levels can be achieved with the circuit of FIG. 11.

Further, power control logic 114 receives a confirmation signal from bus control logic 112 that indicates slot 206 has actually been decoupled from the I/O bus 202. This will prevent any damage, data loss, or the like that could occur due to removing an actively coupled I/O card. A card presence signal is also provided from slot 206 to power control logic 114 which confirms that there actually is a card 5 in slot 206. Once the power has been removed from slot 206, a signal is sent from power control logic 114 to LED driver 116, which in turn energizes LED 118 (step 14), thereby indicating to a user that the slot has been decoupled from the bus, the slot has been de-energized and the card can now be removed (step 15) in accordance with the previously described mechanical guide means, or the like (FIGS. 1–5). In one preferred embodiment, electromechanical device 107, such as a relay, solenoid switch, or the like, can be used to physically prevent the card from being removed unless it has been powered down. Subsequent to step 15 the process of removing an adapter card from an I/O slot ends at step 16. It should be noted that those skilled in the art will understand there are many different implementations of control logic 205, and the present invention is not limited by any one particular implementation. For example, any portion of the external control logic 205 could be incorporated into the direction control logic 207, although additional pins on direction control logic 207 would be required. Also, other logic, used as power domain control to reduce power consumption by inactive devices, could be used in the hot plug function to control power to a slot that supports hot plugging.

In the second example, it will be assumed that a card is being inserted into a slot on a computer system. In this case, the card to be inserted is either new, or is replacing another adapter card which has been removed in accordance with steps 10–15. Therefore, at step 2 it is determined that there is not an adapter card 5 in connector 4 of slot 206. Step 3 then ensures that the power has been removed from slot 206, as indicated by LED 118, and the fact that a new card 5 cannot be physically inserted into a slot, due to the electromechanical device 107, if there is power applied to the slot (normally, power should not be supplied to an empty slot). At step 4, the new adapter card 5 is inserted into connector 4 of slot 206, using the mechanical apparatus of the present invention as described in conjunction with FIGS. 1–5. Electromechanical device 107 will then issue the card presence signal to power control logic 114, thereby indicating that new card 5 is physically present in slot 206 (step 5). Receipt of the card presence signal by logic 114 indicates that electrical power can now be gradually applied to slot 206 through the slot power and slot ground power distribution lines using apparatus such as previously described in accordance with FIG. 11 (step 6). Once slot 206 is powered up, the power control logic 114 then provides a control signal to LED driver 116 which causes the LED to be turned off indicating to the user that power is now applied to the slot and the card cannot be removed. At step 7, the power control logic issues a connect bus control signal to bus control circuit 112, which in turn sends an enable signal to the direction control logic 207, thus causing secondary bus 209 to be coupled with the primary I/O bus 202. The RST# signal from DRV/RECV module 204 is then deactivated at step 8. At this time the new card 5 is physically present in connector 4, with the power applied to slot 106, and the secondary bus 209 connected to I/O bus 202. All that remains is for the software in the computer system to begin configuration activity, such as determining what type of card has been installed and type of protocol it uses (step 9). The configuration software may read a read only memory (ROM) on the adapter card to make these determinations. Subsequent to configuration data processing activity using the new card can begin. The installation process is then complete and the method of FIG. 10 ends at step 16.

Figure 12:
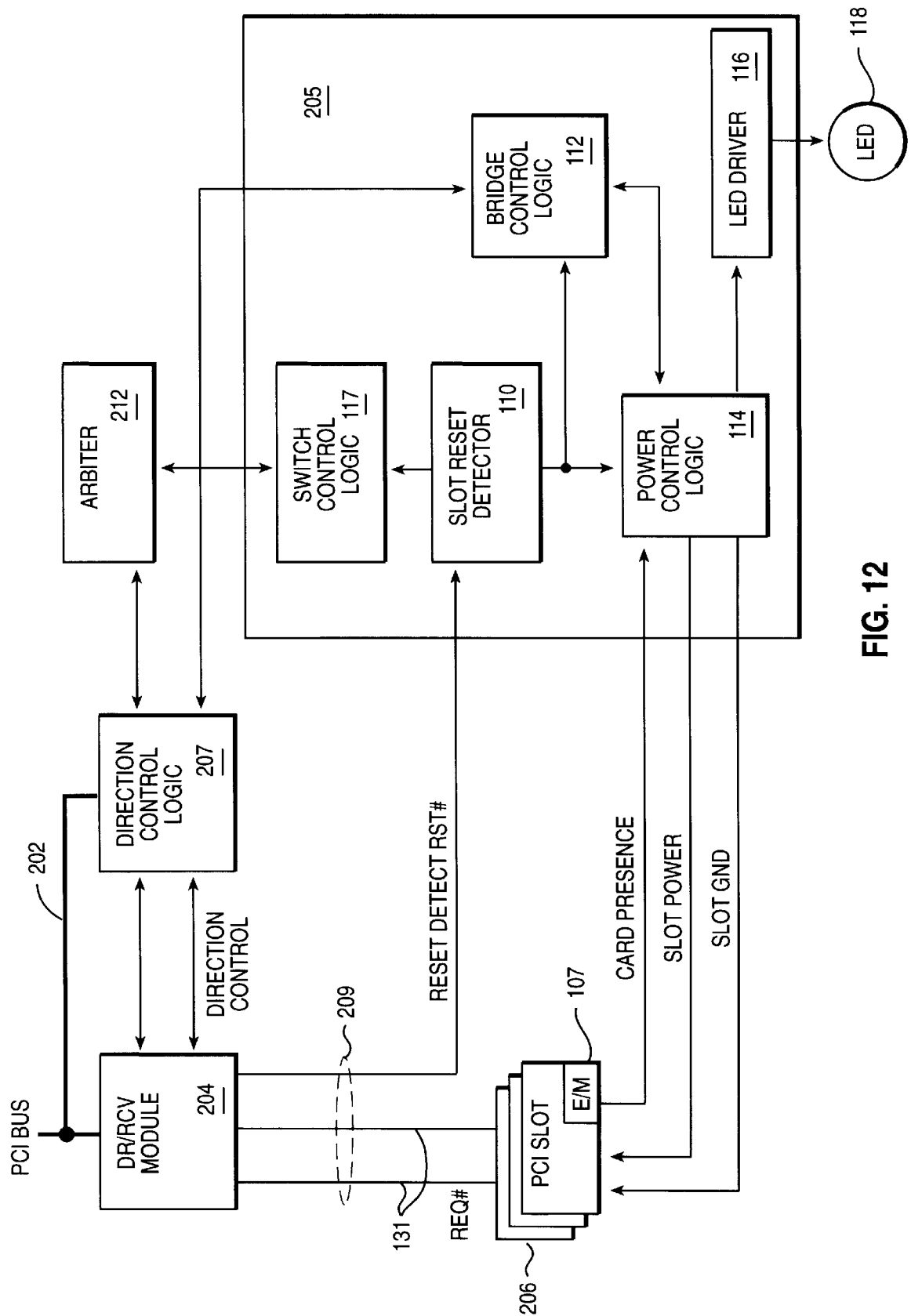
FIG. 12 is a block diagram illustrating one preferred embodiment of the present invention wherein a bank of slots can be deactivated to install, remove or replace a card without requiring the entire system to be taken off line.

FIG. 12 shows a block diagram of an embodiment of the present invention wherein a bank of slots 206 are controlled by a single DRV/RECV module 204. These slots can then be controlled, i.e. deactivated, as a group. Reference numerals in FIG. 12 corresponding to the same numerals used in the previous Figures are intended to represent similar components and will not be discussed again. It can be seen that reset detector 110 provides a control signal, based on reset signal RST# to arbiter 212. This arbiter is a standard logic device which receives requests for ownership of the secondary bus 209 and then awards the bus to the DRV/RECV module 204 and associated direction control logic, or one of the slots 206, based on a set of predetermined criteria, e.g. the device which least recently had access to the bus. Arbiter 212 is shown as being connected to direction control logic 207, but is also connected to each slot 206. Request lines 131 are shown which transmits a bus request signal from slots 206 to arbiter 212, via DRV/RECV module 204. Those skilled in the art will understand that bus 209 contains many other control signal lines, such as an arbitration grant line, and the like which indicates to a particular slot that the bus has been awarded to that particular slot subsequent to an arbitration cycle. Other lines accommodating data and address signals are also included in bus 209, but not shown in FIG. 12. The request lines 131 pass through the DRV/RECV module 204 and are controlled by switch control logic 117. It should be noted that there will be one set of DRV/RECV for each slot present in the bank. Upon detection of the RST# signal from DRV/RECV module 204, switch control logic 117, sends a control signal to arbiter 130 which then awards ownership of bus 209 to the DRV/RECV module 204 and associated direction control logic 209. This ensures that none of the slots 206 in the bank have ownership of the bus 209 when the process of deactivating the bank of slots is initiated. Concurrently, with the signal sent to arbiter 212, switch control logic 117, also sends a control signal to the DRV/RECV module 204, which degates its request lines 131, thus, preventing any of the cards in the slots 206 from requesting access to bus 209 and initiating an arbitration cycle. Once arbitration is disabled, then the bank of slots 206 can be deactivated using the same techniques as described above.

The flowchart of FIG. 13 will now be described in conjunction with FIG. 12. If at step 1a of FIG. 10 it is determined that a bank of slots is present in the computer system, then step 17 of FIG. 13 determines if the card, or cards, to be removed or replace is one of the slots in the bank. If so, then at step 18 slot reset detector 110 provides a control signal to switch control logic 117, which in turn provides a signal to arbiter 212. At step 19, arbiter 212 awards ownership of bus 209 to DRV/RECV module 204 and associated direction control logic 207. Switch control logic 117 then debates bus request signal lines 131 by degating the request lines in the DRV/RECV module 204 (step 20). At step 21 the configuration software stops activity to the feature cards in slots 206. DRV/RECV module 204 and associated direction control logic 207 then decouples secondary bus 209 from I/O bus 202 at step 22. The power to the bank of slots is then gradually decreased at step 23. At step 24, LED 118 indicates when the power is removed from slots 206, and the card, or cards can then be removed (step 25).

If at step 17, it is determined that a card is to be inserted into one of the slots 206 in the bank, then the slots in the bank will be inactive (step 26) since the bank has previously been deactivated in accordance with steps 18–25. At step 27 the card(s) 5 to be added to the computer system are inserted into connector(s) 4. Electromagnetic switch(es) 107 then indicates the presence of the card(s) (step 28). The power to the bank of slots is then gradually increased at step 29 and an indication is given that bus 209 can be coupled to I/O bus 202 by DRV/RECV module 204. At step 30, DRV/RECV module 204 and associated direction control logic 207, then reconnects secondary bus 209 to I/O bus 202. The reset signal is deactivated at step 31. This causes the switch control logic to enable arbitration for bus 209 by gating on DRV/RECV module 204 (step 32). The configuration software for each card in the bank of slots allows the card(s) 5 in the bank of slots to begin data processing activities (step 33). Subsequent to both steps 25 and 33, the process continues to step 16 (FIG. 8) and ends.

Although certain preferred embodiments have been shown and described, it should be understood that many changes and modifications may be made therein without departing from the scope of the appended claims.

We claim:

1. A computer system including a system bus connecting a CPU and memory, comprising:

a secondary bus of architecture to connect a predetermined number of devices;

a bridge for interconnecting said system bus with said secondary bus;

tri-state operable driver and receiver circuits connecting a plurality of individual buses compatible with said secondary bus architecture while supporting a number of said devices greater than said predetermined number and responsive to a directional control means;

means for establishing a clock rate on the secondary bus at a level less than that defined by the secondary bus architecture;

arbitration means for issuing a grant signal to indicate ownership of said secondary bus by one of said devices connected to one of said individual buses; and said direction control means for steering information from said secondary bus to a particular one of said devices connected to one of said plurality of individual buses, based upon said grant signal.

2. A system according to claim 1 wherein said direction control means issues a device select signal corresponding to said particular one of said devices when a corresponding grant signal is received from said arbitration means.

3. A system according to claim 2 further comprising means for changing a hardware configuration of said system by deactivating said particular one of said devices while said CPU concurrently performs data processing operations.

4. A system according to claim 3 wherein said particular one of said devices is interconnected to said one of said plurality of individual buses through an I/O slot.

5. A system according to claim 4 further comprising means for determining whether said I/O slot contains said particular one of said devices.

6. A system according to claim 5 wherein said means for changing comprises:

means for activating a reset control signal;

means for detecting said reset control signal; and means for resetting said particular one of said devices in said I/O slot.

7. A system according to claim 6 wherein said means for changing further comprises:

means for causing, in response to said means for resetting, said means for generating to decouple said I/O slot from said one of said individual buses, and for reducing electrical power to said I/O slot.

8. A system according to claim 7 wherein said means for changing further comprises:

means for indicating when said I/O slot is deactivated and said particular one of said devices can be removed;

means for detecting when another device is installed in said I/O slot; and means for increasing, in response to detection of said new feature card, electrical power to said connector.

9. A system according to claim 8 wherein said means for changing further comprises means for coupling said I/O slot to said one of said individual buses, and for deactivating said reset control signal.

10. A system according to claim 9 wherein said means for changing further comprises means for initiating data processing activities for said another device in said I/O slot.

11. A method for connecting devices in a computer system having a CPU and memory connected by a system bus, said method comprising the steps of:

connecting a predetermined number of devices by a secondary bus of specified architecture;

interconnecting said system bus and said secondary bus with a bridge;

connecting through tri-state operable driver and receiver circuits a plurality of individual buses compatible with said secondary bus architecture while supporting a number of said devices greater than said predetermined number, the driver and receiver circuits being responsive to a directional controller;

establishing a clock rate on the secondary bus at a level less than that defined by the secondary bus architecture;

issuing an arbitrated grant signal by an arbitrator to indicate ownership of said secondary bus by one of said devices connected to one of said individual buses; and steering information by said directional controller between said secondary bus and said plurality of individual buses.

12. A method according to claim 11 wherein said step of steering further comprises the step of steering said information from said secondary bus to a particular one of said devices connected to one of said plurality of individual buses, based upon said arbitrated grant signal.

13. A method according to claim 12 wherein said step of issuing further comprises the step of issuing a device select signal corresponding to said particular one of said devices responsive to a corresponding arbitrated grant signal.

14. A method according to claim 13 further comprising the step of changing a hardware configuration of said system by deactivating said particular one of said devices while said CPU concurrently performs data processing operations.

* * * * *